US011877547B2

(12) United States Patent  
Manzoni et al.

(10) Patent No.: US 11,877,547 B2  
(45) Date of Patent: Jan. 23, 2024

(54) AEROPONICS APPARATUS

(71) Applicant: LettUs Grow Ltd, Bristol (GB)

(72) Inventors: Lillian Rose Manzoni, Bristol (GB); Benjamin George Crowther, Bristol (GB); Thomas Hyde Didiot-Cook, Bristol (GB)

(73) Assignee: LeftUs Grow Ltd, Bristol (GB)

( * ) Notice: Subject to any disclaimer, the term of this patent is extended or adjusted under 35 U.S.C. 154(b) by 288 days.

(21) Appl. No.: 17/594,310

(22) PCT Filed: Apr. 14, 2020

(86) PCT No.: PCT/GB2020/050950  
§ 371 (c)(1),  
(2) Date: Oct. 11, 2021

(87) PCT Pub. No.: WO2020/208381  
PCT Pub. Date: Oct. 15, 2020

(65) Prior Publication Data  
US 2022/0151172 A1   May 19, 2022

(30) Foreign Application Priority Data  
Apr. 12, 2019   (GB) ..................... 1905257

(51) Int. Cl.  
*A01G 31/00*   (2018.01)

(52) U.S. Cl.  
CPC .................. *A01G 31/00* (2013.01)

(58) Field of Classification Search  
CPC ..................................... A01G 31/00  
See application file for complete search history.

(56) References Cited

U.S. PATENT DOCUMENTS

| 2003/0048038 | A1 | 3/2003 | Tsai |
| 2010/0320255 | A1 | 12/2010 | Sato et al. |
| 2016/0235023 | A1* | 8/2016 | Thoma ................. A01G 31/02 |
| 2017/0347546 | A1 | 12/2017 | Varesano |

FOREIGN PATENT DOCUMENTS

| CN | 101167438 A | 4/2008 |
| CN | 201263707 Y | 7/2009 |
| CN | 102046297 A | 5/2011 |

(Continued)

OTHER PUBLICATIONS

Written Opinion of the International Preliminary Examining Authority issued in International Application No. PCT/GB2020/050950 dated Feb. 22, 2021.

(Continued)

*Primary Examiner* — Monica L Perry  
*Assistant Examiner* — Brittany A Lowery  
(74) *Attorney, Agent, or Firm* — Vos-IP, LLC

(57) ABSTRACT

An aeroponics apparatus (1, 201) comprising a grow bed (3, 203) with a reservoir (11, 211) for containing a liquid or a solution. An ultrasonic nebulizer module (5, 205) is attached to the grow bed (3, 203). The ultrasonic nebulizer module (5, 205) comprises an ultrasonic horn (23, 223) having an input end (25, 225) connected to an ultrasonic transducer (27, 227) and an output tip (35, 235). The ultrasonic horn (23, 223) is in contact with a wall (33, 233) of the reservoir (11, 211).

16 Claims, 3 Drawing Sheets

(56) References Cited

FOREIGN PATENT DOCUMENTS

| | | |
|---|---|---|
| CN | 202524857 U | 11/2012 |
| CN | 105537047 A | 5/2016 |
| CN | 106513232 A | 3/2017 |
| CN | 107529733 A | 1/2018 |
| CN | 206821574 U | 1/2018 |
| EP | 3119179 A1 | 1/2017 |
| FR | 3018666 A1 | 9/2015 |
| GB | 2567630 A | 4/2019 |
| JP | S53-140854 A | 12/1978 |
| JP | 2003-116379 A | 4/2003 |
| JP | 2007-292434 A | 11/2007 |
| JP | 2007-330940 A | 12/2007 |
| JP | 2011-220636 A | 11/2011 |
| KR | 10-2012-0017487 A | 2/2012 |
| KR | 101477087 B1 | 12/2014 |
| KR | 10-2017-0089212 A | 8/2017 |
| WO | WO/2016/108031 A1 | 7/2016 |
| WO | WO/2016/133804 A1 | 8/2016 |

OTHER PUBLICATIONS

Search & Examination Report issued in Chinese Application No. CN202080042833.8 dated Nov. 1, 2022.
International Search Report issued in International Application No. PCT/GB2020/050950 dated Jun. 18, 2020.
Written Opinion of the ISA issued in International Application No. PCT/GB2020/050950 dated Jun. 18, 2020.
International Preliminary Report on Patentability issued in International Application No. PCT/GB2020/050950 dated Jul. 20, 2021.
Search Report issued in British Application No. GB1905257.0 dated Sep. 20, 2019.

* cited by examiner

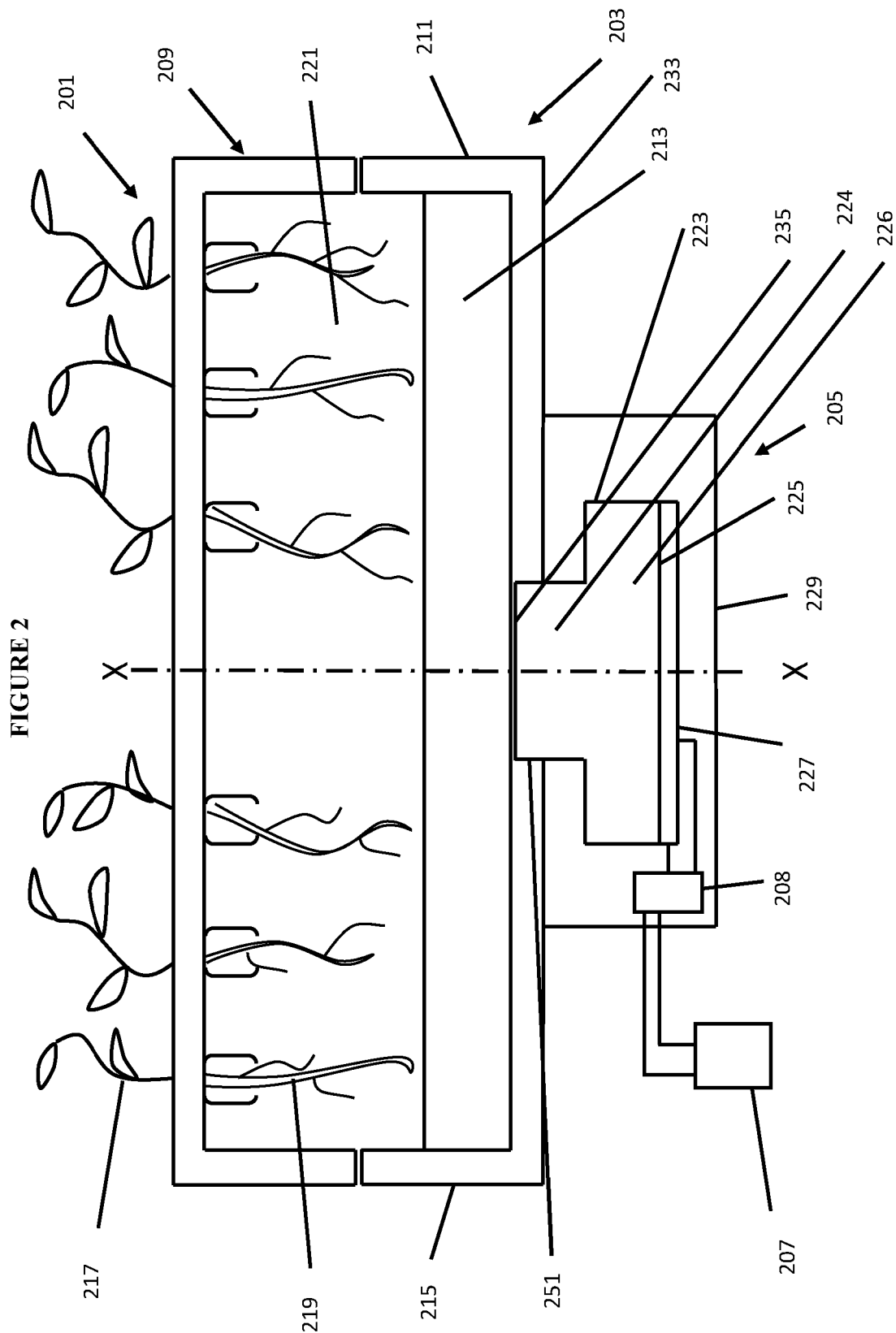

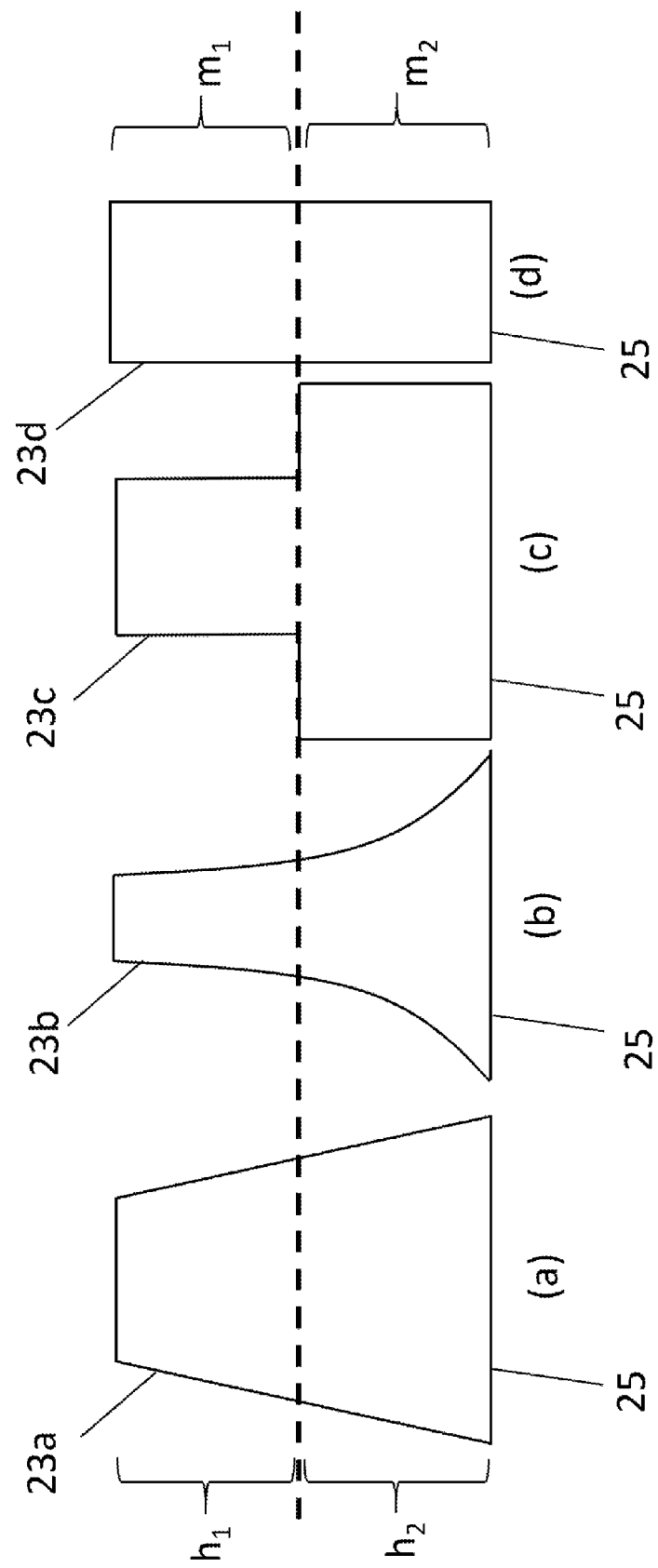

AEROPONICS APPARATUS

CROSS-REFERENCE TO RELATED APPLICATIONS

This application is a 371 National Phase Entry of International Patent Application No. PCT/GB2020/050950 filed on Apr. 14, 2020, which claims the benefit of British Patent Application No. 1905257.0 filed on Apr. 12, 2019, the contents of which are incorporated herein by reference in their entirety.

FIELD OF THE INVENTION

The present invention relates to an aeroponics apparatus for use in an indoor farming system for the growing of plants, for example a vertical farm or greenhouse. In particular, the present invention utilizes an ultrasonic nebulizer with an ultrasonic horn (or sonotrode) to impart ultrasound waves to a nutrient solution in a reservoir of a grow bed in order to cause part of the nutrient solution to atomize and form a dense, nutrient rich, aerosol or mist to feed the root systems of the plants located directly above the grow bed. The term "aeroponics" is to be understood to encompass growing systems in which the plant roots are allowed to grow into the nutrient solution, such that they can take up water directly from the nutrient solution (such a system could be referred to as a hydro/aeroponic system).

BACKGROUND OF THE INVENTION

It is known to use an ultrasonic nebulizer (or ultrasonic fogger) to create aerosols to provide water and nutrients to plant roots. However, prior art systems utilizing ultrasonic nebulizers have characteristics which cause a number of problems for the operators of indoor farming systems in which they are utilized. It is desired to have an aeroponic apparatus which maximizes the working life of the equipment, for example the ultrasonic transducer or the grow bed, which can utilize the least amount of electrical energy to create the desired level of aerosol, which is easy to keep clean and which has a minimum level of complexity, in order to minimize the cost of both building or buying the equipment and maintaining it. This list of requirements is not easy to satisfy, and it is not met by the prior art aeroponics systems.

In some prior art systems, the ultrasonic nebulizers are fixed to the bottom of the reservoir of the grow bed, such that the ultrasonic transducer and, for a piezoelectric transducer, the piezoelectric disc, is in direct contact with the nutrient solution. This causes a problem when cleaning the apparatus because the cleaning has to take place around each nebulizer, for example in the region where the nebulizer joins the grow bed. The area around each nebulizer provides a breeding ground for bacteria and thus poses a risk to the health of the plants within the grow bed. It is inevitable that an aeroponic system will create plant detritus and any such organic matter will build up in the area around the nebulizers and the region where they adjoin the bed. This is undesirable because those buildups will allow harmful bacteria to grow, and the buildups can become a breeding ground for insects and other pests. In the case of a piezoelectric transducer it is disadvantageous to place the piezoceramic material in the nutrient solution because actuation of the piezoelectric transducer causes microfissures to form in the protective coating (resin) on top of the piezoceramic material and nutrient solution can then come into contact with that piezoceramic material. That contact with the nutrient solution causes stray current which can reduce the performance of the transducer or lead to its failure. However, there are good reasons why the prior art arrangements place the ultrasonic nebulizers within the reservoir and in contact with the nutrient solution.

Placement of the ultrasonic transducers in direct contact with the nutrient solution means that there is a very low level of attenuation of the ultrasound waves. Any interface between the ultrasonic transducers and the nutrient solution results in attenuation of the ultrasound waves as they travel from the ultrasonic transducer and through the nutrient solution. The efficiency of converting electrical energy into the generation of aerosol is thus maximized, through reduction of interfaces. This is beneficial because it reduces the operating cost of the farm. It is also noted that reflection of the ultrasound waves occurs when they pass through an interface and this reflection results in attenuation of the ultrasound waves, which is the cause of the majority of the reduction in the ultrasonic energy that is available for the generation of aerosol. The proportion of sound reflected at an interface is dependent upon the impedance of the materials. Reflection at an interface is reduced if the ultrasound waves are travelling from a high impedance material to a low impedance material for example, from plastic to metal to liquid.

In addition, in locating the ultrasonic nebulizers within the reservoir they can be readily fixed to the bottom of the reservoir, typically with a mechanical fixing such as a screwed or bolted fixture.

It is also the case that an ultrasonic transducer generates a great deal of heat when it is being operated. If the ultrasonic transducer is placed in the nutrient solution, then the heat is dissipated by that nutrient solution. In the absence of such an efficient way of dissipating the heat then at best, the working life of the ultrasonic transducer will be reduced, and it is even possible for the ultrasonic transducer to burn out. In either scenario the farm owner will incur undesirable additional costs, alongside farm downtime resulting in loss in revenue. The heat dissipation potential of the nutrient solution also ensures that the ultrasonic transducer does not overheat. Additionally, the grow beds are typically made of a polymer material and heat from an uncooled ultrasonic transducer can cause degradation of the polymer material, leading to a reduced working life of the grow bed. It can also cause the polymer material to melt, causing the grow bed to fail whereby it must be replaced immediately. However, it is not desirable to radiate excess heat into the nutrient solution because the temperature of the nutrient solution should be kept stable, measured relative to the aerial temperature, to maximize crop yield and maintain the health of the plants. Consequently, utilizing the nutrient solution as a heat sink is suboptimal.

There is no straightforward solution for overcoming these problems.

SUMMARY OF THE INVENTION

Placing a cover over the ultrasonic nebulizer, so that the ultrasonic transducer is no longer in contact with the nutrient solution, would mean that the working life of the transducer would no longer be reduced due to contact with the nutrient solution, but the cooling effect of the nutrient solution would be reduced and so the transducer may fail early due to running at a temperature that is too high. In addition, placing a cover over the ultrasonic nebulizer would lead to an attenuation of the ultrasound waves and a reflection of ultrasound waves at the interface of the cover, which would require that the ultrasonic transducer is driven at a higher voltage, with the result that the energy usage is higher (energy efficiency falls) and the life of the transducer is decreased.

Simply taking the piezoelectric transducer out of the nutrient reservoir and adhering it to the underside of the grow bed tray will not provide the solution to the problems either. If the piezoelectric transducer has been taken out of the heat sink, provided by the nutrient solution, then it will suffer from a reduced working life due to being operated at a temperature that is higher than the optimal temperature. Also, the grow bed will act to attenuate the ultrasound waves because of the inherent impedance properties of the grow bed material and because the interface will cause reflection of some of the ultrasound waves. Consequently, the ultrasonic transducer would need to be driven harder. A higher driving voltage and higher instantaneous current would be used. This has the disadvantage that repeated exposure of the piezoelectric transducer to such voltages and currents can damage the transducer, particularly when the voltages and currents are over a threshold. The result is that the energy usage is higher (energy efficiency falls), and the life of the transducer is decreased (as above). This may also result in overheating of the grow bed, leading to material degradation or failure.

According to the present invention there is provided an aeroponics apparatus comprising a grow bed with a reservoir for containing a liquid or a solution, an ultrasonic nebulizer module attached to the grow bed, the ultrasonic nebulizer comprising an ultrasonic horn having an input end connected to an ultrasonic transducer and an output tip wherein the ultrasonic horn is in contact with a wall of the reservoir. The ultrasonic horn can be configured so that its shape amplifies, i.e., increases the amplitude of, the ultrasound waves being produced by the ultrasonic transducer whilst remaining in resonance with the ultrasonic transducer. An ultrasonic horn which amplifies, i.e., which increases the amplitude of the ultrasound waves, increases the conversion efficiency of electrical to mechanical energy. This results in more energy being converted and less energy being wasted. The amplification/increase in amplitude is advantageous because it can be used to compensate for the reflection of the ultrasound waves when they pass across any interface that is located between the ultrasonic transducer and the liquid or solution within the reservoir and thus it ensures that the ultrasound waves are able to generate the desired quantity of aerosol. The amplification is also advantageous because it enables the energy requirements of the ultrasonic transducer to be reduced. A lower "driving" voltage can be utilized to generate the desired quantities of aerosol and this makes it cheaper to operate the farm. An amplifying ultrasonic horn allows the ultrasonic nebulizer to generate the same amount of aerosol but with a lower power consumption than would otherwise be the case, thus reducing the amount of electricity that is used. An increase in the conversion efficiency of electrical to mechanical energy means that energy is conserved in a high grade form. This is contrasted with a device for transmitting ultrasound waves from a transducer that would convert the energy in those waves into a lower grade form of acoustic energy (e.g., lower energy density), or that would convert the energy in the ultrasound waves into waste heat.

The ultrasonic horn can also be configured so that its shape is not intended to cause any increase in the amplitude of the ultrasound waves, but instead it is acoustically transparent. Such an acoustically transparent horn is intended to neither reduce nor increase the conversion efficiency of electrical to mechanical energy. The embodiments of the present invention illustrated in FIGS. 1 and 2 illustrate a single ultrasonic nebulizer module for simplicity of explanation. In practical application of the invention it is likely that multiple ultrasonic nebulizer modules will be fitted to each grow bed.

In a first preferred embodiment of the aeroponics apparatus the output tip of the ultrasonic horn is located within an aperture that passes through the wall of the reservoir, such that in use of the apparatus, the output tip is in contact with the liquid or solution contained within the reservoir. This is advantageous because the liquid or solution within the reservoir is able to provide cooling to the ultrasonic transducer via the ultrasonic horn, although this is a secondary, reduced, cooling effect. The ultrasonic horn can also act as a heatsink, for example by being connected to a metal outer casing of the ultrasonic nebulizer module, whereby heat is radiated into the aerial environment. This allows a heating, ventilation and air conditioning system can provide the primary source of cooling. In addition, the number of interfaces within the ultrasonic nebulizer and between that nebulizer and the rest of the system is minimized and thus the amount of attenuation and reflection of the ultrasound waves is minimized. The ultrasonic horn may be a close fit within the aperture or there may be an interference fit. Alternatively, it may be beneficial to provide an acoustic reflecting material between the ultrasonic horn and the wall of the reservoir to ensure that the amount of ultrasound transmitted to the liquid or solution is maximized.

According to a second embodiment of the present invention the output tip of the ultrasonic horn is in contact with the external side of the wall of the reservoir. This provides an advantage because it avoids making a hole in the wall of the reservoir which has the potential to compromise the water-tightness of the reservoir.

In the apparatus of the second embodiment the output tip of the ultrasonic horn is preferably located within a recess extending from the external side of the wall of the reservoir. Furthermore, the thickness of the wall of the reservoir adjacent to the recesses is a small fraction of the average thickness of the wall of the reservoir. It is advantageous to keep the thickness of the wall of the reservoir adjacent to the ultrasonic horn at a minimum thickness to reduce attenuation of the ultrasound waves.

Preferably, the aeroponics apparatus comprises a switching circuit that can supply electrical power to the ultrasonic nebulizer module or that can remove that supply of electrical power to the ultrasonic nebulizer module.

Preferably, the reservoir is in the form of a tray having a bottom wall and at least one side wall protruding upwardly from the bottom wall.

Preferably, the ultrasonic horn is made from a metal such as an aluminum alloy or a titanium alloy. A suitable metal will have a low acoustic loss and a high fatigue strength.

Preferably the ultrasonic horn is adhesively bonded to the ultrasonic transducer. An adhesive fixing has been found to be preferable for the connection between the ultrasonic horn and the ultrasonic transducer because mechanical fixings, such as threaded arrangements are more likely to change the acoustic properties of the transducer and/or reduce the intensity of the ultrasound. Adhesives such as two-part epoxy resins have good acoustic properties and can also provide the desired level of thermal conductivity. However, it is possible to utilize a mechanical fixing.

Preferably, the longitudinal length of the ultrasonic horn is one quarter of, or an odd multiple of one quarter of, the wavelength of the ultrasound waves that, in use, travel within the ultrasonic horn (the wavelength of the ultrasound changes as it passes through the different materials within the system) produced by the ultrasonic transducer. For example, the longitudinal length of the ultrasonic horn may be three-quarters of a wavelength. This is advantageous because it reduces the destructive interference caused when a portion of the sound wave undergoes internal reflection at the interface between the output tip of the ultrasonic horn and the nutrient solution. The ultrasound waves reflected back into the body of the ultrasonic horn from the output tip interact constructively with the other ultrasound waves. Such an ultrasonic horn would be acoustically transparent.

Alternatively, the longitudinal length of the ultrasonic horn is one half, or an odd multiple of one half of, the wavelength of the ultrasound waves that, in use, travel within the ultrasonic horn. Such an ultrasonic horn would be amplifying.

Preferably, the ultrasonic transducer is a poled piezoelectric transducer, and the direction of poling is aligned with the longitudinal axis X-X of the ultrasonic horn.

Preferably, the liquid is a nutrient solution formed from a mixture of water and nutrients.

In an envisaged embodiment of the present invention the ultrasonic horn is formed integrally with the reservoir, for example if the reservoir were to be manufactured from aluminum and the ultrasonic horn formed or cast into a wall of the reservoir.

Preferably, the ultrasonic horn is a solid, one-piece, body and has an upper half that is of lower mass than a lower half, wherein the height of the upper half is the same as the height of the lower half.

Preferably, the ultrasonic horn is a solid, one-piece, body with a cylindrical upper half and a cylindrical lower half wherein the diameter of the upper half is smaller than the diameter of the lower half and wherein the upper half and the lower half are coaxially aligned.

BRIEF DESCRIPTION OF THE FIGURES

FIG. 2 is a schematic cross-sectional view of an aeroponics apparatus according to a second embodiment of the present invention; and FIG. 3 is a schematic view of four ultrasonic horn shapes for use in either the first embodiment or the second embodiment of the present invention.

DETAILED DESCRIPTION OF THE INVENTION

Figure 1:
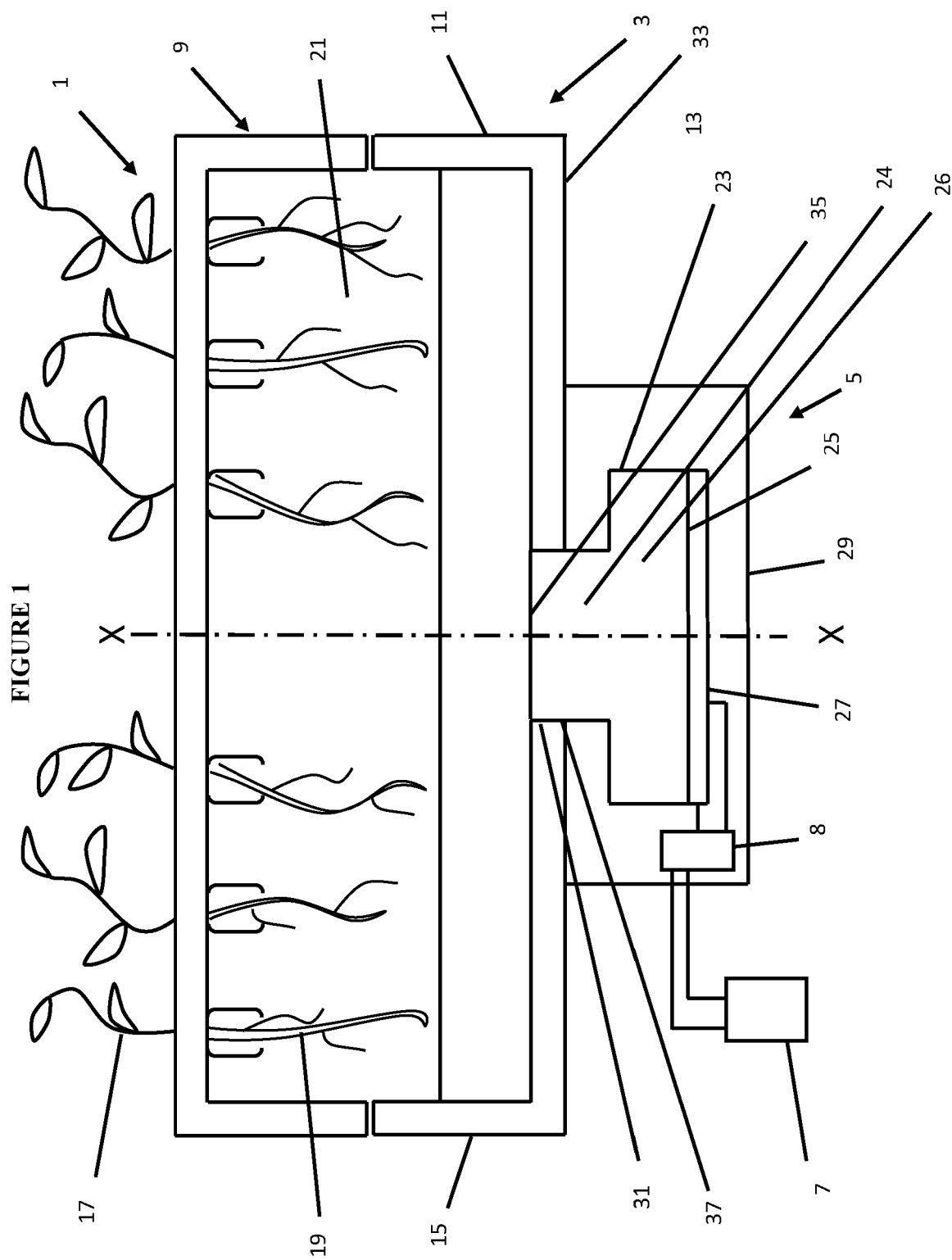
FIG. 1 is a schematic cross-sectional view of an aeroponics apparatus according to a first embodiment of the present invention.

FIG. 1 illustrates an aeroponics apparatus (1), according to a first embodiment of the present invention, for use in an indoor farming system. The aeroponics apparatus (1) comprises a grow bed (3) to which an integrated ultrasonic nebulizer module (5) is attached by any suitable means, such as by an adhesive or by mechanical fixings. An electrical supply supplies electrical power to the integrated ultrasonic nebulizer module (5) and is switched on and off by a switching circuit (7). A variation circuit (8), that is located within the ultrasonic nebulizer module (5), can vary the electrical supply so that it is appropriate to the ultrasonic transducer being utilized. A plant support (9) is located above the grow bed (3).

The grow bed (3) comprises a nutrient solution reservoir (11) within which is contained a nutrient solution (13), for example a mixture of water and plant fertilizer. The grow bed (3) has side walls (15) which support the plant support (9). The plant support (9) has a partially open construction, and the plants (17) are supported by it and the plant roots (19) can grow through it into the root bed space (21).

The integrated ultrasonic nebulizer module (5) comprises an ultrasonic horn (23) adhesively bonded at the input end (25) of the horn (23) to a piezoelectric ultrasonic transducer (27) with a two-part epoxy resin adhesive. The ultrasonic horn (23) has a stepped profile in cross section and a circular shape when viewed from above. The upper section (24) is in the form of a solid cylinder of smaller diameter than a lower section (26) that is also in the form of a solid cylinder. The upper section (24) and the lower section (26) are formed integrally, from the same material, such that the ultrasonic horn (23) is formed in one piece and such that the mass of the upper section (24) is lower than the mass of the lower section (26). The piezoelectric ultrasonic transducer has an exposed, resin coated, piezoelectric ceramic disc and it uses a PZT-4 piezoelectric crystal. The PZT-4 crystal exhibits the inverse piezoelectric effect, i.e., when it is exposed to an electric charge the material will change dimensions. When the piezoelectric crystal is supplied with an electrical supply having the form of a sine wave the piezoelectric crystal, and thus the piezoelectric transducer will oscillate at the frequency of that sine wave. The piezoelectric transducer (27) is poled such that its direction of vibration is along the longitudinal axis X-X of the piezoelectric transducer (27), so that when those vibrations are converted into ultrasound waves that pass through the ultrasonic horn (23) substantially all of the ultrasound waves propagate in the X-X direction and a minimized amount of energy is entrained in laterally directed ultrasound waves. The length of the ultrasonic horn (23) is one quarter of the wavelength of the ultrasound that travels within the ultrasonic horn (23). An outer casing (29) partially surrounds the ultrasonic horn (23) and the piezoelectric ultrasonic transducer (27), and the piezoelectric ultrasonic transducer (27) is compressed between the outer casing (29) and the ultrasonic horn (23). The piezoelectric transducer (27) is mechanically preloaded to pressures of 10-30 kPa to improve operational efficiency, e.g., through restricting energy losses.

The grow bed (3) is provided with an aperture (31) in the bottom wall (33) of the reservoir (11) and the ultrasonic horn (23) is aligned with the aperture (31) such that its output tip (35) is located flush with the inside surface of the bottom wall (33). The ultrasonic horn (23) is a close fit with the aperture (31) and the fit may even be an interference fit. A seal (37) is provided so that the reservoir is watertight.

The switching circuit (7) has a mechanical relay (not shown) which is used to supply electrical power to the ultrasonic nebulizer module (5) or to remove that supply of electrical power. The mechanical relay can be commanded by farm control software, such as LettUs Grow's Ostara® software.

In use, when it is desired to supply water and nutrients to the roots of the plants via an aerosol, the switching circuit (7) is operated by the farm control software to provide a supply of electrical power to the variation circuit (8). The variation circuit (8) changes the frequency of the supplied electrical supply to a frequency that matches the inherent resonant frequency of the piezoelectric transducer (27) (i.e., ~1.7 MHz), and provides that electrical supply, with the specified electrical supply waveform, to the piezoelectric transducer (27).

The piezoelectric transducer (27) converts the electrical energy in the electrical power supply to ultrasound waves.

The ultrasound waves pass into the input end (25) of the ultrasonic horn (23), across the adhesive bond interface between the ultrasonic horn (23) and the transducer (27). The ultrasound waves spread through the ultrasonic horn (23) towards the output tip (35), along the longitudinal axis X-X. The ultrasonic horn (23) amplifies, i.e., increases the amplitude of, the ultrasound waves produced by the piezo-electric ultrasonic transducer (27).

When the ultrasound waves reach the output tip (35) they are then transmitted across the interface between the output tip (35) and the nutrient solution. The ultrasound waves then spread through the nutrient solution until they reach the surface of the nutrient solution. The high pressure of the ultrasound waves causes a column of nutrient solution to extend from the surface. Surface acoustic waves on the column stimulate capillary wave motions to create the aerosol.

When sufficient aerosol has been created for the purposes of supplying water and nutrients to the roots of the plants then the switching circuit (7) turns off the electrical supply to the piezoelectric transducer (27), such that the generation of ultrasound waves ceases.

FIG. 2 illustrates an aeroponics apparatus (201), according to a second embodiment of the present invention, for use in an indoor farming system. The second embodiment shares many features with the first embodiment and those shared features are referenced utilizing the same reference numerals as for the first embodiment but prefixed with the number (2). In the second embodiment there is no aperture in the bottom wall (233) of the reservoir (211). Instead, a recess (251) has been provided in the wall (233), such that the thickness of the wall (233) at the recess (251) is reduced. The ultrasonic horn (223) is located within the recess (251).

FIG. 3 illustrates four possible forms of the ultrasonic horn (23, 223) for use in the first and second embodiments. FIG. 3(a) illustrates a conical horn, FIG. 3(b) an exponential horn, FIG. 3(c) a stepped horn and FIG. 3(d) a cylindrical horn. The ultrasonic horns (23) are all formed as a one-piece solid from a single material and they can be thought of having an upper half and a lower half, wherein the height of the upper half is $h_1$ and the height of the lower half is $h_2$ and $h_1$ is equal to $h_2$.

FIGS. 3(a), 3(b), and 3(c) illustrate that the mass of the upper half of the ultrasonic horns, $m_1$, is lower than the mass of the lower half of the ultrasonic horn, $m_2$.

In use, the conical, exponential, and stepped horns (23a, 23b, and 23c) respectively, cause an increase in the amplitude of the ultrasound waves produced by the ultrasound transducer (27, 227) when it is attached to the input end (25).

FIG. 3(d) illustrates that, for the cylindrical ultrasonic horn (23d) the mass of the upper half $m_1$, is the same as the mass of the lower half $m_2$.

In use, ultrasound waves are produced by the ultrasonic transducer (27, 227) and they are passed into the ultrasonic horn (23d), when the transducer (27, 227) is attached to the input end (25) of the ultrasonic horn (23d). The cylindrical horn (23d) does not cause an increase in the amplitude of the ultrasound waves. The amplitude of the ultrasound waves remains the same as they pass through the ultrasonic horn (23d). The cylindrical horn (23d) has a longitudinal length that is one quarter, or an odd multiple of one quarter, of the wavelength of the ultrasound waves travelling through the horn (23d). This results in an ultrasonic horn (23d) which is acoustically transparent.

What is claimed is:

1. An aeroponics apparatus (1, 201I) comprising: a grow bed (3, 203) with a reservoir (11, 211) for containing a liquid or a solution and an ultrasonic nebulizer module (5, 205) attached to the grow bed (3, 203), the ultrasonic nebulizer module (5, 205) comprising an ultrasonic horn (23, 223) having an input end (25, 225) connected to an ultrasonic transducer (27, 227), wherein the ultrasonic transducer (27, 227) is between the ultrasonic horn (23, 223) and an outer casing (29, 229) which partially surrounds the ultrasonic horn (23, 223) and the ultrasonic transducer (27, 227), and an output tip (35, 235), wherein the ultrasonic horn (23, 223) is in contact with a wall (33, 233) of the reservoir (11, 211).

2. An aeroponics apparatus (1, 201) as claimed in claim 1 wherein the output tip (35, 235) of the ultrasonic horn (23, 223) is located within an aperture (31, 231) that passes through the wall (33, 233) of the reservoir (11, 211), such that in use of the apparatus (1, 201), the output tip (35, 235) is in contact with the liquid or the solution contained within the reservoir (11, 211).

3. An aeroponics apparatus (201) as claimed in claim 1 wherein the output tip (235) of the ultrasonic born (223) is in contact with an external side of the wall (233) of the reservoir (211).

4. An aeroponics apparatus (201) as claimed in claim 3 wherein the output tip (235) of the ultrasonic horn (223) is located within a recess (251) extending from the external side of the wall (233) of the reservoir (211).

5. An aeroponics apparatus (201) as claimed in claim 4 wherein the thickness of the wall (233) at the recess is reduced.

6. An aeroponics apparatus (1, 201) as claimed in claim 1 further comprising a switching circuit (7, 207) that can supply electrical power to the ultrasonic nebulizer module (5, 205) or that can remove that supply of electrical power to the ultrasonic nebulizer module (5, 205).

7. An aeroponics apparatus (1, 201) as claimed in claim 1 wherein the reservoir (11, 211) is in the form of a tray having a bottom wall (33, 233) and at least one side wall (15, 215) protruding upwardly from the bottom wall (33, 233).

8. An aeroponics apparatus (1, 201) as claimed in claim 1 wherein the ultrasonic horn (23, 223) is made from a metal.

9. An aeroponics apparatus (1, 201) as claimed in claim 1 wherein the ultrasonic horn (23, 223) is adhesively bonded to the ultrasonic transducer (27, 227).

10. An aeroponics apparatus (1, 201) as claimed in claim 1 wherein the longitudinal length of the ultrasonic horn (23, 223) is one quarter of, or an odd multiple of one quarter of, the wavelength of the ultrasound waves that, in use, travel within the ultrasonic horn (23, 223).

11. An aeroponics apparatus (1, 201) as claimed in claim 1 wherein the longitudinal length of the ultrasonic horn (23, 223) is one half, or an odd multiple of one half of, the wavelength of the ultrasound waves that, in use, travel within the ultrasonic horn (23, 223).

12. An aeroponics apparatus (1, 201) as claimed in claim 1 wherein the ultrasonic transducer (27, 227) is a poled piezoelectric transducer (27, 227) and the direction of poling is aligned with the longitudinal axis X-X of the ultrasonic horn (23, 223).

13. An aeroponics apparatus (1, 201) as claimed in claim 1 wherein the solution is a nutrient solution formed from a mixture of water and nutrients.

14. An aeroponics apparatus (1, 201) as claimed in claim 1 wherein the ultrasonic horn (23, 223) is formed integrally with the reservoir (11, 211).

15. An aeroponics apparatus (1, 201) as claimed in claim 1 wherein the ultrasonic horn (23, 223) is a solid, one-piece body and has an upper half (24, 224) that is of lower mass than a lower half (26, 226), wherein the height of the upper half is substantially the same as the height of the lower half.

16. An aeroponics apparatus (1, 201) as claimed in claim 1 wherein the ultrasonic horn (23, 223) is a solid, one-piece, body with a cylindrical upper half (24, 224) and a cylindrical lower half (26, 226) wherein the diameter of the upper half (24, 224) is smaller than the diameter of the lower half (26, 226) and wherein the upper half (24, 224) and the lower half (26, 226) are coaxially aligned.

\* \* \* \* \*

UNITED STATES PATENT AND TRADEMARK OFFICE
CERTIFICATE OF CORRECTION

PATENT NO. : 11,877,547 B2
APPLICATION NO. : 17/594310
DATED : January 23, 2024
INVENTOR(S) : Lillian Rose Manzoni et al.

Page 1 of 1

It is certified that error appears in the above-identified patent and that said Letters Patent is hereby corrected as shown below:

On the Title Page

Column 1, (73) Assignee, replace "LeftUs Grow Ltd, Bristol (GB)" with --LettUs Grow Ltd, Bristol (GB)--

Signed and Sealed this
Ninth Day of April, 2024

Katherine Kelly Vidal
*Director of the United States Patent and Trademark Office*